United States Patent
Adams et al.

(10) Patent No.: US 10,142,209 B2
(45) Date of Patent: Nov. 27, 2018

(54) SYSTEMS AND METHODS FOR INCREASING WIRELESS THROUGHPUT LIMITATIONS ON ETHERNET ON A WIRELESS ACCESS POINT

(71) Applicant: DELL PRODUCTS L.P., Round Rock, TX (US)

(72) Inventors: Joel Quinn Adams, Austin, TX (US); Manjesh Siddamurthy, Round Rock, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 136 days.

(21) Appl. No.: 15/133,001

(22) Filed: Apr. 19, 2016

(65) Prior Publication Data

US 2017/0303165 A1    Oct. 19, 2017

(51) Int. Cl.
  *H04L 12/26* (2006.01)
  *H04L 12/709* (2013.01)
  *H04L 12/803* (2013.01)

(52) U.S. Cl.
  CPC .......... *H04L 43/0882* (2013.01); *H04L 43/16* (2013.01); *H04L 43/0811* (2013.01); *H04L 45/245* (2013.01); *H04L 47/122* (2013.01)

(58) Field of Classification Search
  CPC ... H04L 12/26; H04L 12/803; H04L 43/0882; H04L 43/16; H04L 47/122; H04W 28/085
  See application file for complete search history.

(56) References Cited

U.S. PATENT DOCUMENTS

| | | | |
|---|---|---|---|
| 2004/0001467 A1* | 1/2004 | Cromer | H04W 28/08 370/338 |
| 2011/0075556 A1* | 3/2011 | Li | H04W 28/08 370/230 |
| 2013/0208589 A1* | 8/2013 | Lopez Toledo | H04W 72/1263 370/230 |
| 2014/0293790 A1* | 10/2014 | Xiao | H04W 28/0289 370/235 |
| 2015/0163691 A1* | 6/2015 | Levi | H04W 28/0205 370/328 |
| 2016/0309345 A1* | 10/2016 | Tehrani | H04W 72/0426 |
| 2017/0026263 A1* | 1/2017 | Gell | H04L 43/0882 |

* cited by examiner

*Primary Examiner* — Charles C Jiang
*Assistant Examiner* — Kyaw Z Soe
(74) *Attorney, Agent, or Firm* — North Weber & Baugh LLP

(57) ABSTRACT

The present invention relates generally to an information handling system. Aspects of the present invention include a mitigation of a wired backhaul limitation with a single Ethernet on a wireless access point (AP). In embodiments, a wireless controller can monitor the wired traffic on a plurality of wireless access points. In embodiments, the wireless controller can distribute traffic across a plurality of wireless access points, when a wireless access point is going to approach its wired backhaul limitation, by setting up a temporary wireless connection between AP's. Thus, more than one wireless access point can share the wired backhaul load of other AP's and mitigate its wired backhaul limitation.

20 Claims, 5 Drawing Sheets

SYSTEMS AND METHODS FOR INCREASING WIRELESS THROUGHPUT LIMITATIONS ON ETHERNET ON A WIRELESS ACCESS POINT

BACKGROUND

Field of Invention

The present invention relates generally to information handling systems and more particularly relates to increasing wireless throughput limitations with Ethernet on a wireless network system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems provide increasingly more central and critical operations in modern society, it is important that the networks are reliable. One important element in information handling systems is wireless network systems. Wireless speeds and bandwidth have greatly improved and are becoming even faster.

FIG. 1 depicts a prior art wireless network system according to embodiments in this patent document. Figure shows wireless network system 100. FIG. 1 shows wide area network (WAN) 105 coupled to wireless controller 110. FIG. 1 also shows Ethernet switch 115, wireless access points (AP) 120, 125, and 130. One limitation to wireless network system 100 is the wired Ethernet backhaul. Typically, in prior art systems, the limitation is 1 gigabyte per second (Gbps) Ethernet throughput. Often the throughput limitation is not reached.

However, wireless throughput with Institute of Electrical and Electronics Engineers (IEEE) standard 802.11ac and especially with wave 2 can exceed the 1 Gbps Ethernet throughput traditionally provided to the wireless AP backhaul interface. Theoretical wireless speeds for 5 GHz 802.11n 3×3 40 MHz channel width is 450 Mbps. With IEEE 802.11ac, a 3×3 client using 80 MHz channels and quadrature amplitude modulation (QAM), it is theoretically possible to have aggregate wireless throughput of 1.3 Gbps. If two 3×3 clients are situated to allow a multi-user multiple input and multiple output (MU-MIMO) transmission from a 4×4 IEEE 802.11ac wave 2 AP, then it is theoretically possible for the combined maximum downlink throughput to be 2.6 Gbps.

Actual achievable throughput is significantly lower than these theoretical numbers, and in practice it is rare to see applications that approach 1 Gbps at the AP backhaul link (data connection between the wireless controller and the AP which handles the traffic for all the clients on the AP) because IEEE 802.11ac wave 2 AP's are being combined with older AP's. As IEEE 802.11ac AP's become more prevalent, the backhaul limitation becomes a more frequent problem. However, it is desirable to have a solution to assure no backhaul congestion.

One prior art solution is to provide an additional Ethernet cable. However, the cost of providing the additional wired bandwidth to each AP is high. Providing a wireless AP with two teamed Ethernet ports of 1 Gbps each allows up to 2 Gbps, but requires pulling 2 Cat 6 wires to each AP and requires 2 ports on the switch. Another prior art solution is to use a 2.5G Ethernet link, which is expected to be standardized soon, but it is also an expensive solution because the Phy circuits for each end of the link are 10G Ethernet capable.

Accordingly, what is needed is to overcome the limitations of the wireless backhaul in wireless networking system, particularly in IEEE 802.11ac wave 2 systems.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF THE PREFERRED EMBODIMENTS

Figure 1:
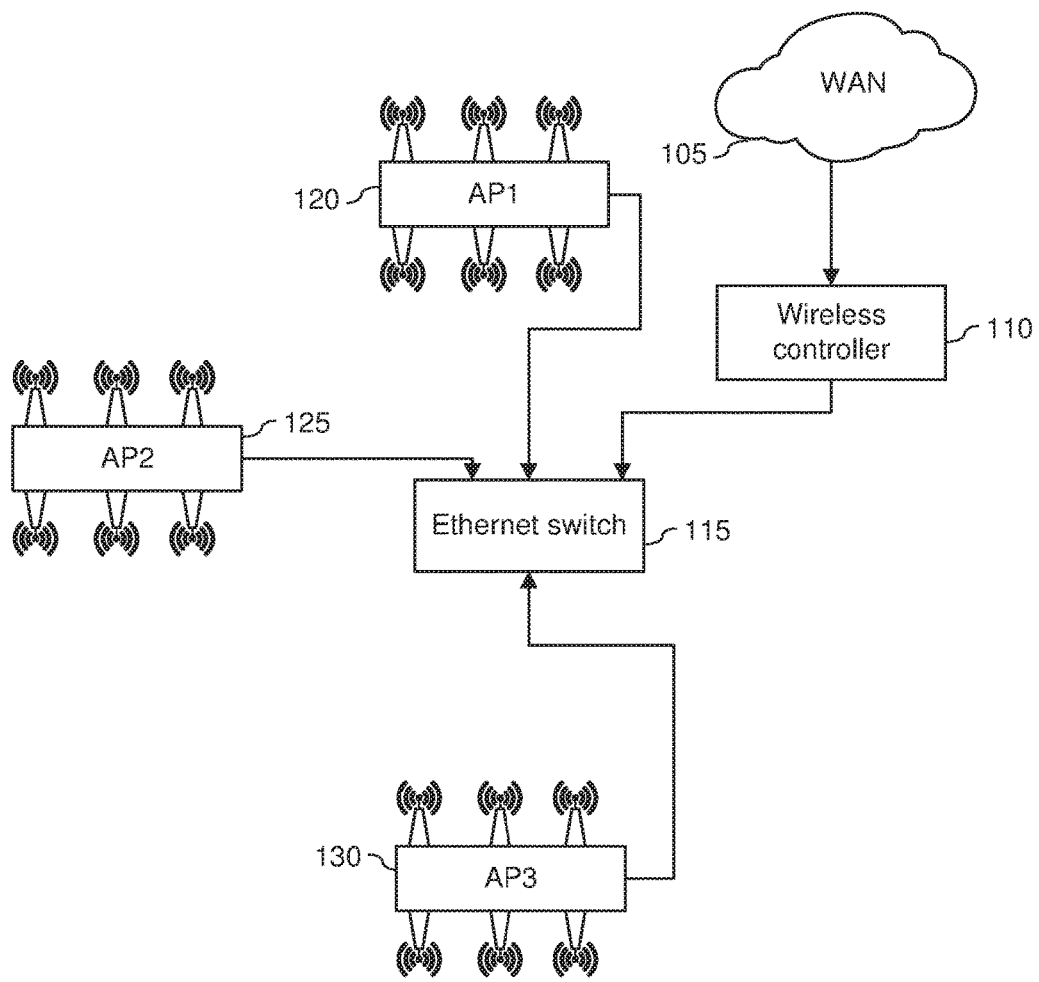
FIG. 1 depicts a prior art wireless network system according to embodiments in this patent document.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "packet," "datagram," "segment," "traffic flow," or "frame" shall be understood to mean a group of bits that can be transported across a network. These terms shall not be interpreted as limiting embodiments of the present invention to particular layers (e.g., Layer 2 networks, Layer 3 networks, etc.); and, these terms along with similar terms such as "data," "data traffic," "information," "traffic flow," "cell," etc. may be replaced by other terminologies referring to a group of bits, and may be used interchangeably.

Furthermore, it shall be noted that: (1) certain steps may optionally be performed; (2) steps may not be limited to the specific order set forth herein; (3) certain steps may be performed in different orders; and (4) certain steps may be done concurrently.

The present invention relates in various embodiments to devices, systems, methods, and instructions stored on one or more non-transitory computer-readable media involving the communication of data over networks. Such devices, systems, methods, and instructions stored on one or more non-transitory computer-readable media can result in, among other advantages, the mitigation of wireless backhaul limitations.

It shall also be noted that although embodiments described herein may be within the context of removing the wireless backhaul limitations with Ethernet on a wireless access point and in particular with reference to IEEE 802.11ac wave 2, the invention elements of the current patent document are not so limited. Accordingly, the invention elements may be applied or adapted for use in other contexts.

Figure 2:
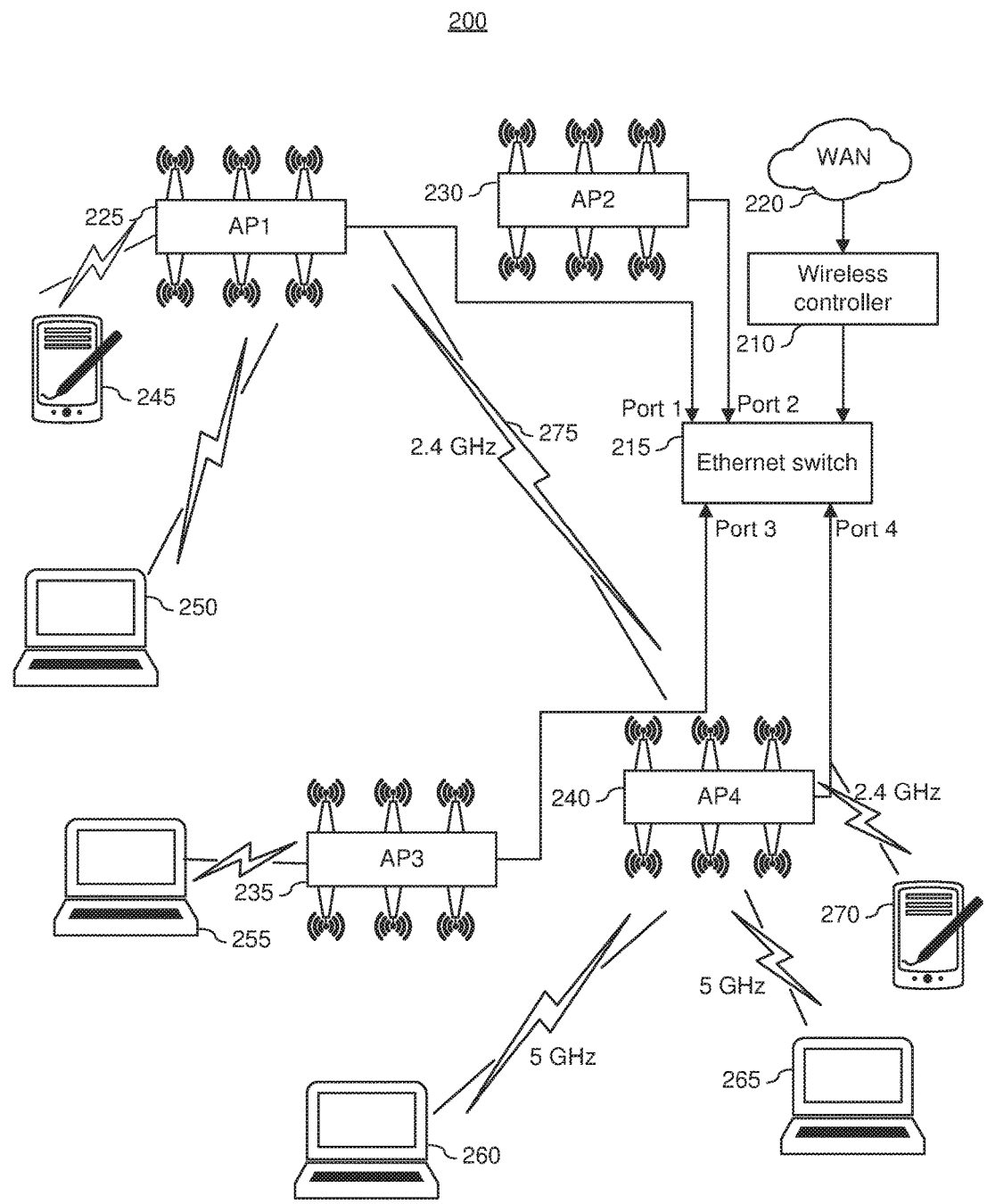
FIG. 2 depicts a wireless network system according to embodiments in this patent document.

FIG. 2 depicts a wireless network system 200 according to embodiments in this patent document. FIG. 2 shows wireless network system 200 including WAN 220, wireless controller 210, Ethernet switch 215, and wireless AP's, AP1 225, AP2 230, AP3 235, and AP4 240. Each wireless AP can have a plurality of clients wirelessly coupled to the wireless AP. FIG. 2 shows wireless clients 260, 265, and 270 wirelessly coupled to AP4 240. FIG. 2 shows wireless device 235 wirelessly coupled to AP3 235. FIG. 2 also shows wireless devices 245 and 250 wirelessly coupled to AP 1 225.

There are certain differences between Ethernet and wireless communications. Embodiments disclosed take advantage of some of these differences.

Ethernet generally consistently trains up and maintains the max data rate where wireless often falls back to slower technology to maintain connectivity at distance, or because radio frequency (RF) interference prevents supporting faster technologies.

Ethernet is simultaneously bi-directional, but IEEE 802.11 wireless is half duplex. Transmit and receive are not possible at the same time—because both directions use the same RF channel (Cellular radios use different receive and transmit channels at the same time). While this difference does not change the maximum throughput mismatch between wired and wireless, the practical implications of packet responses being in parallel rather than serial to various traffic situations favors Ethernet.

Ethernet is single point to point between devices so it is generally less lossy (fewer packet retries) than wireless communication—due to the significant effects of RF interference.

Wireless communication is generally encrypted over the air, which adds overhead to the transmission, Ethernet is not often encrypted (but can also be).

Wireless communication shares a channel with multiple clients to the same AP. There are often cases where clients cannot detect each other and interfere with the uplink communication of another client. This event reduces the available bandwidth of the channel.

The result is available Ethernet aggregate throughput is very consistently near the max data rate, while wireless throughput is consistently below the theoretical max data rate.

In embodiments, an enterprise wireless network system may be implemented. In an enterprise wireless network environment AP's are generally positioned in a campus site plan to best separate the three non-overlapping 2.4 GHz channels. However, due to client density, there may be a lot of overlap in AP site deployments so the AP's with the same channels can see each other on the 2.4 GHz bands. There are many more 5 GHz channels and the propagation at 5 GHz is shorter than at 2.4 GHz, so the spatial overlap of the 2.4 GHz band channels is more common than in the 5 GHz band channels.

In the enterprise network environment, there is a significant overlap in the access point coverage. Thus, when an AP is considered to be heavily loaded, then a client that is also able to reach a less loaded AP is moved to that AP. Thus, the load may be balanced across APs. The load balancing can be especially effective on the 5 GHz band which has more non-overlapping channels.

IEEE 802.11ac wave 2 devices are being offered at a premium and the deployment benefits related to improved client density with IEEE 802.11ac wave 2 clients are a limited set of use cases. Therefore, the expectation is that IEEE 802.11ac wave 2 AP's will be initially deployed in strategic locations within an otherwise IEEE 802.11n or IEEE 802.11ac enterprise deployment.

Deployment of IEEE 802.11ac wave 2 includes MU-MIMO which allows 5 GHz downlink only to be simultaneously sent to two different clients at the same time (different packet content). This capability, downloading different content to 2 clients at the same time, can stress the throughput of the Ethernet backhaul the most. However, this capability requires specific Client capabilities and also adequate spatial separation and environmental characteristics conducive to beam forming from the AP. So it is expected to be rare within the enterprise campus deployment, until this technology is more common.

All clients on a 5 GHz channel may share the available throughput, but if a 5 GHz client is only IEEE 802.11n or IEEE 802.11a capable then it's usage of the max IEEE 802.11ac throughput is much greater than the actual Ethernet throughput used (bandwidth efficiency is low). So often, the existence of mixed client capabilities actively competing for bandwidth around an AP can prevent the AP's from hitting any backhaul throughput ceiling. Also, wireless to wireless transfers (if any) will not affect the backhaul requirements.

Enterprise wireless AP's have dual radios allowing 2.4 GHz and 5 GHz operation fully independent from each other (and independent of the traffic on the Ethernet port as well).

Enterprise AP's have multiple chains (2, 3 or 4) of transmit and receive radio frequency (RF) and digital signal processing "streams" for each radio band all within a single AP.

WIFI radio cards have base band application specific chipsets with integrated processors both for the client and the access point solutions, but the enterprise AP also has a control plane CPU to manage the additional features that are required. These CPU's are powerful enough to do deep packet inspection and enable advanced functionality including virtual controller functions.

Each wireless client can use throughput from the AP. The majority of client applications require large downlink throughput (not as much uplink), browsing, streaming, downloading files, receiving server data, email content, cloud applications, etc. Any congestion buffering happens at the wireless controller 210, or at the server application not in the AP 225, 230, 235, and 240. The IEEE 802.11ac wave 2 MU-MIMO feature adds simultaneous downlink to clients, but not symmetrically providing simultaneous uplink. Therefore, the focus of this patent document is on downlink throughput for most applications. However, the embodiments described herein also apply to the uplink path.

Uplink throughput requirements are normally limited to the rarer cases of uploading a file or sending emails with file attachments, but are still applicable. In this case, congestion buffering happens at the client application.

In order to allow a wireless AP, for example AP4 240 in FIG. 2, with a higher throughput capability than its Ethernet connection can support, to prevent congestion, enable the AP's 2.4 GHz radio to connect to another AP, for example AP1 225 in FIG. 2, in the enterprise network, which is not currently fully using its Ethernet port throughput. This wireless link 275 becomes a temporary wireless connection used to provide a multi-chassis ling aggregation (MLAG) between the two AP's for the purpose of augmenting the backhaul throughput of the busy AP's, effectively sharing the wired link of a second AP.

Link Aggregation (LAG) can be used to combine the two backhaul paths (wired and wireless) in the busy AP to extend the throughput capability beyond the 1 Gbps limit of the wired connection. While a 1 Gbps limit is disclosed, any other limit can be used as well. Embodiments disclosed can be applied to any wired backhaul limitation.

In embodiments, dynamic lag can be used by the wireless controller 210 to direct packets through the available wired and wireless backhaul paths (using criteria similar to hash algorithm, 5-tuple load balancing) to distribute some of the traffic to the second AP, AP1 225 in the embodiment shown in FIG. 2, using the wireless connection through the AP1 225.

While this pairing is not a simple teamed port pair (due to asymmetry in available throughput and lag), the resulting throughput improvement can be similarly combined. In embodiments, a variant of the Equal cost multipath (ECMP) method can alternatively be used to distribute the traffic between the available wired and wireless backhaul paths to AP4 240.

In embodiments, WIFI on the 2.4 GHz band can support up to 450 Mbps between the AP's in an enterprise network with the same allocated channel (using IEEE 802.11ac protocols, 3 streams and 40 MHz channel width, and 216 Mbps with 20 MHz channel width). One of ordinary skill in the art will understand that these standards, channel width, and streams are exemplary only are examples only and not intended to be limiting and that any other wireless standard, channel width, and streams can also be used.

Because of the proximity of AP's in an enterprise network deployment, the availability of communication with another AP on the same channel is likely without channel impact to the 2.4 GHz clients associations on either AP. In embodiments, AP's can temporarily switch channels if needed to communicate with closer AP's at the highest possible throughputs (at the cost of some client re-association).

Since the IEEE 802.11ac throughput has a theoretical max of 1.3 Gbps (for 3×3 SU-MIMO), the addition of a few hundred Mbps from the provided 2.4 GHz path can be shown to be adequate for the worst case congestion situation. However, one of ordinary skill in the art will understand that these maximums, additions, and paths provided are examples only and not intended to be limiting.

In the case of IEEE 802.11ac with MU-MIMO, the maximum theoretical throughput of 2.6 Gbps from two 3×3 clients is not possible on paper with this MLAG solution (nor with 2.5 Gbps Ethernet). Again, one of ordinary skill in the art will understand that these maximums, additions, and paths provided are examples only and not intended to be limiting.

But a more practical max realized throughput of 725 Mbps each could be supported. And the more probable cases of multiple single stream MU-MIMO clients (3 mobile phones at 433 bps each) or a pair of 2×2 MU-MIMO tablet/notebooks. In either case, embodiments disclosed can satisfy these maximums with a lower cost deployment of single 1 Gbps backhaul connections to each AP. In embodiments, neighboring AP's can supply additional backhaul if needed.

In embodiments, if the 5 GHz IEEE 802.11ac clients on one AP are being sent so much traffic that the 1 Gbps Ethernet port throughput ceiling is becoming a limitation, then the wireless controller 210 can direct a portion of the Ethernet traffic to another nearby AP which can see the highly loaded AP on the same channel of the 2.4 GHz band, and using that channel, transfer the additional backhaul traffic for the first AP wirelessly 275. The resulting backhaul throughput can then theoretically be up to 1.45 Gbps, when only 1 Gbps Ethernet is deployed to each AP. Again, one of ordinary skill in the art will understand that these maximums are examples only and not intended to be limiting.

FIG. 2 shows use of the 2.4 GHz radio band in the wireless AP4 240 to make a wireless connection 275 to a nearby wireless AP, wireless AP1 225 on the same channel (at up to 450 Mbps throughput), to gain access to its 1 Gbps wired backhaul link. Aggregate this wireless backhaul with the 1 Gbps link on the wireless AP 4 240 to provide up to 1.45 Gbps total backhaul throughput when needed. This wireless backhaul connection can be dynamically added when needed without added cable costs.

Since the throughput congestion problem is greater on the downlink path, the downlinks all go through the wireless controller 210 and Ethernet switch 215. In embodiments, the wireless controller 210 can monitor traffic information from the wireless AP's, AP1 225, AP2 230, AP3 235, and AP4 240. Traffic information may include the traffic throughput, clients, type of clients, applications on the clients, and type of applications on the clients. Knowing the client and applications can be important in predicting future throughput. For example, if the client is a mobile phone and the application is an email application, there is not likely to be high throughput. However, if the client is a mobile phone and the application is streaming video, there is more likely to be higher throughput in the near future. Also, knowing that AP4 240 has three clients as opposed to just one is also relevant in predicting future throughput, especially when the client information is combined with the application information. For example, if AP4 240 has three wireless clients 260, 265, and 270 and all of them are streaming video, then AP4 is more likely to reach its backhaul bandwidth limitations.

Currently, the wired backhaul limitation is 1 Gbps. However, the exact number of the limitation is not important to the embodiments disclosed in this patent document. In the future the limitation may be higher, but the embodiments disclosed are still applicable to a higher limitation.

In embodiments shown in FIG. 2, wireless controller 210 receives traffic information from the wireless AP's 225, 230, 235, and 240. Wireless controller 210 may decide that a particular AP is about to reach its wired backhaul limitation and decide to send the traffic to another AP. For example, in FIG. 2, clients 260 and 265 are both simultaneously downloading wirelessly from AP4 240 on the 5 GHz band using the IEEE 802.11ac wave 2 feature of Multi-User MIMO.

In the example shown in FIG. 2, on the 2.4 GHz band, AP4 240 is also providing some data to a client 270. The congestion can occur in Port 4 of the Ethernet switch 215 because the simultaneous data for clients 270 and clients 260 and 265 can exceed 1 Gbps limit of the Ethernet port.

In the example shown in FIG. 2, AP 230 and AP 235 can use channels 1 and 11 respectively for the 2.4 GHz band, so are not able to communicate with AP 240. In the example depicted in FIG. 2, AP1 225 is also deployed using the same 2.4 GHz band channel 6 as AP4 240 uses 275. Thus, AP1 225 and AP4 240 can reach each other wirelessly.

In the example shown in FIG. 2, the clients downloading from AP1 225 are not fully using the bandwidth of port 1 of the switch 215. Therefore, the extra capacity of port 1 of the Ethernet switch 215 can be used by AP4 240 if AP1 225 and AP4 240 can communicate on the 2.4G channel 275 to supply some of the client data from clients 260, 265, and 270 in parallel to the port 4 data. The wireless controller 210 manages these available paths to supply AP4 240 with the downlink bandwidth it needs to satisfy its client's 260, 265, and 270 needs for greater than 1 Gbps throughput. No new wired connections need to be added to achieve this increase in throughput.

For example, if wireless controller 210 realizes that wireless AP AP4 240 is close to reaching its wireless backhaul limitation based on a combination or some or all of throughput, clients, and type of application, then wireless controller 210 may select another AP. In the embodiment shown in FIG. 2, wireless controller 210 selected AP1 225.

Wireless controller 210 can select a wireless AP based on a variety of factors. For example, in embodiments, wireless controller 210 can select an AP based on traffic, channel availability, best wireless connection, or any other relevant factor.

Wireless controller 210 may communicate with AP1 225 to instruct AP1 225 to become a client of AP4 240 and establish a wireless connection 275 with AP4 240. The wireless connection 275 may permit traffic to be shared between AP4 240 and AP1 225 for the purposed of using AP1's 225 wired backhaul.

Since the backhaul limitation is not reached at all times, once no longer necessary, wireless controller 210 may instruct AP1 225 to end the wireless connection 275 with AP4 240.

Furthermore, the wireless throughput augmentation may be used only as needed when the wired interface to the AP is expected to become congested. In essence the AP4 240 is associated with AP1 225, and receives the augmented data when the wireless controller 210 directs it.

In embodiments, the same solution can work in the uplink direction as well. The additional wireless path to the second AP using the 2.4 GHz radio is also an available uplink (MLAG path), but the hash algorithms may be customized to allow the different transmit and receive paths.

Figure 3:
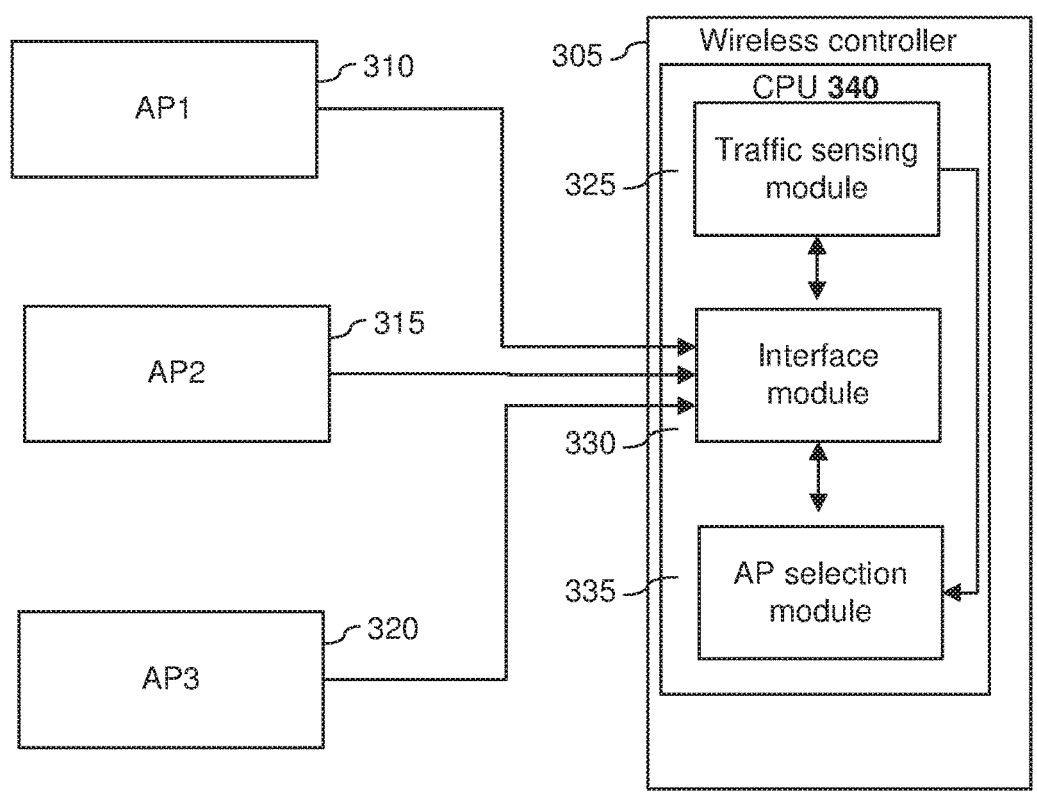
FIG. 3 depicts a block diagram of a wireless controller according to embodiments in this patent document.

FIG. 3 depicts a block diagram of a wireless network system according to embodiments in this patent document. FIG. 3 shows a wireless network system 300 including three wireless AP's AP1 310, AP2 315, and AP3 320 and wireless controller 305. Wireless controller 305 includes CPU 340. CPU 340 has a traffic sensing module 325, an interface module 330, and AP selection module 335.

Interface module 330 interfaces with AP1 310, AP2 320, and AP3 330. AP1 310, AP2 320, and AP3 330 provide traffic information to the interface module 330. Interface module 330 provides that traffic information to the traffic sensing module 325.

Traffic sensing module 325 determines if a particular AP is going to exceed its Ethernet backhaul limitation. As described above, that limitation can be exceeded or predicted to exceed based on a variety of pieces of traffic information, including the traffic throughput, clients, type of clients, applications on the clients, and type of applications on the clients. Traffic information and traffic flow are used interchangeably herein to refer to a variety of pieces of traffic information regarding traffic flow, including the traffic throughput, clients, type of clients, applications on the clients, and type of applications on the clients.

If traffic sensing module 325 senses that an AP is about to exceed its wired backhaul limit, then it communicates with AP selection module 335. AP selection module 335 selects an AP to share the backhaul load. AP selection module 335 can select a wireless AP based on a variety of factors. For example, in embodiments, AP selection module 335 can select an AP based on traffic, channel availability, best wireless connection, or any other relevant factor. Once AP selection module 335 selects an AP, AP selection module communicates with interface module 330 so that interface module 330 may instruct the selected AP to form a wireless connection with the AP about to exceed its wired backhaul limit.

Figure 4:
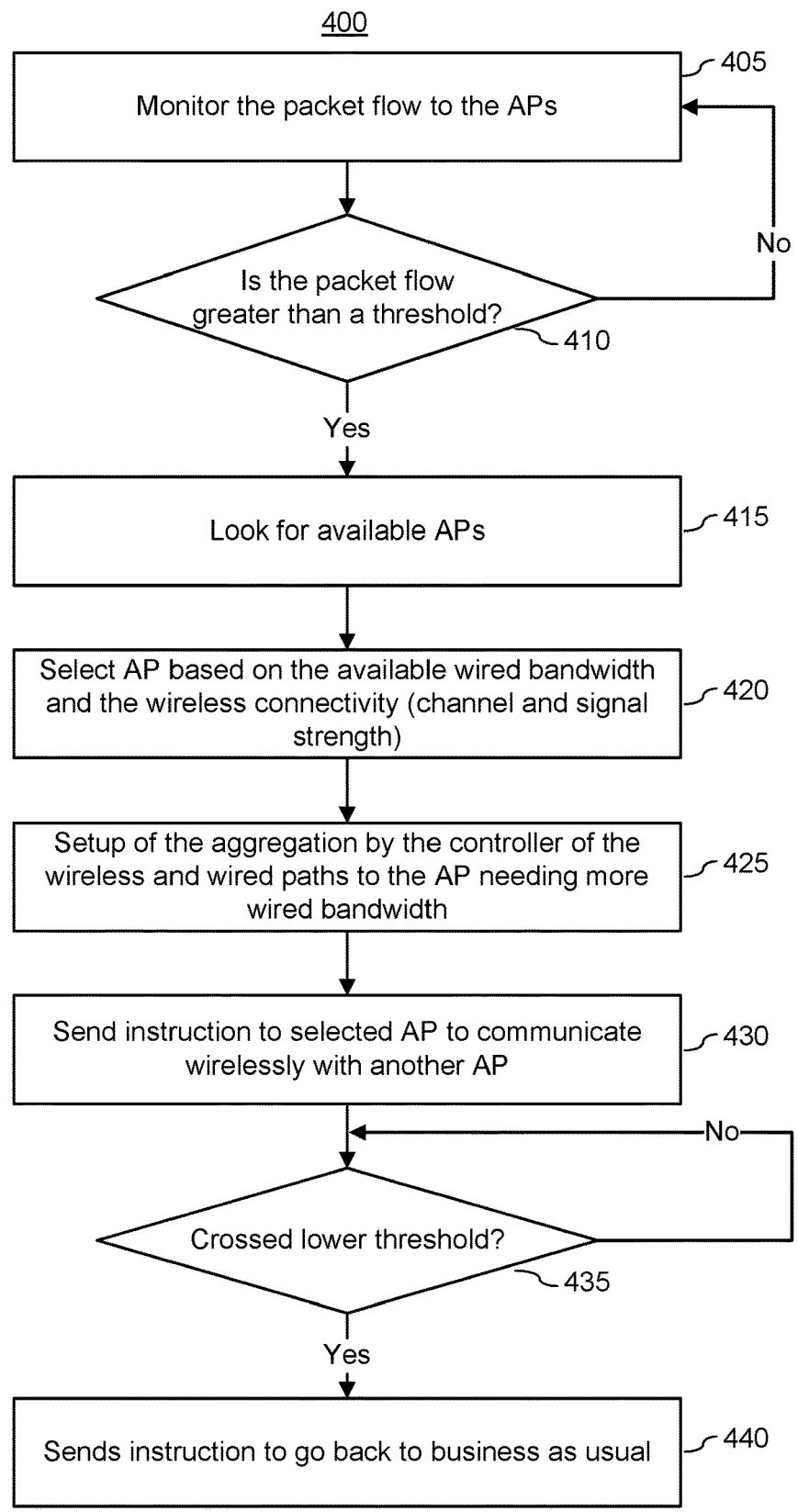
FIG. 4 depicts a flow chart showing a process of wireless multi-chassis link aggregation (MLAG) to mitigate wireless backhaul limitations according to embodiments in this patent document.

FIG. 4 depicts a flow chart showing a process of wireless multi-chassis link aggregation group (MLAG) to mitigate wireless backhaul limitations according to embodiments in this patent document. FIG. 4 shows monitoring the packet flow to the AP's 405. The packet flow includes other traffic information as described above. The monitoring is done to detect when an AP is going to exceed its wired backhaul limit. The monitoring is also compared against a predetermined threshold 410. That predetermined threshold can be a throughput threshold, for example a threshold just below the backhaul limit. It can also be a threshold determined based on the number of clients or type of application used by the clients. The predetermined threshold can vary based on the information received in the monitoring the packet flow 400. For example, if there are a plurality of clients, then threshold can be set lower than if there was one client. Also, if the applications used are bandwidth intensive applications, the threshold can be set even lower so that the AP can be detected prior to exceeding its backhaul limit.

If the packet flow is less than the threshold 410, the monitoring continues 405. If the packet flow is greater than the threshold 410, then look for available AP's 415. An available AP is one that can wirelessly communicate with the AP that is going to exceed its backhaul limit and can share the backhaul wirelessly. As described above, AP selection can be made based on a variety of factors including traffic, channel availability, best wireless connection, or any other relevant factor 420.

Once an AP is selected 420, the controller can setup the aggregation of the wireless and wired paths to the AP needing more wired bandwidth 425. An instruction is sent to the selected AP to communicate wirelessly with the AP about to exceed its backhaul limit 430. The AP's can communicate wirelessly to share the load and avoid congestion at the backhaul due to the backhaul limit.

A lower threshold can be checked 435 to determine when the wireless communication between the AP's can end. Once no longer necessary 435, the AP's end the wireless connection and go back to business as usual 440. If the lower threshold has not been crossed, then continue checking to see if the threshold has been crossed 435.

Figure 5:
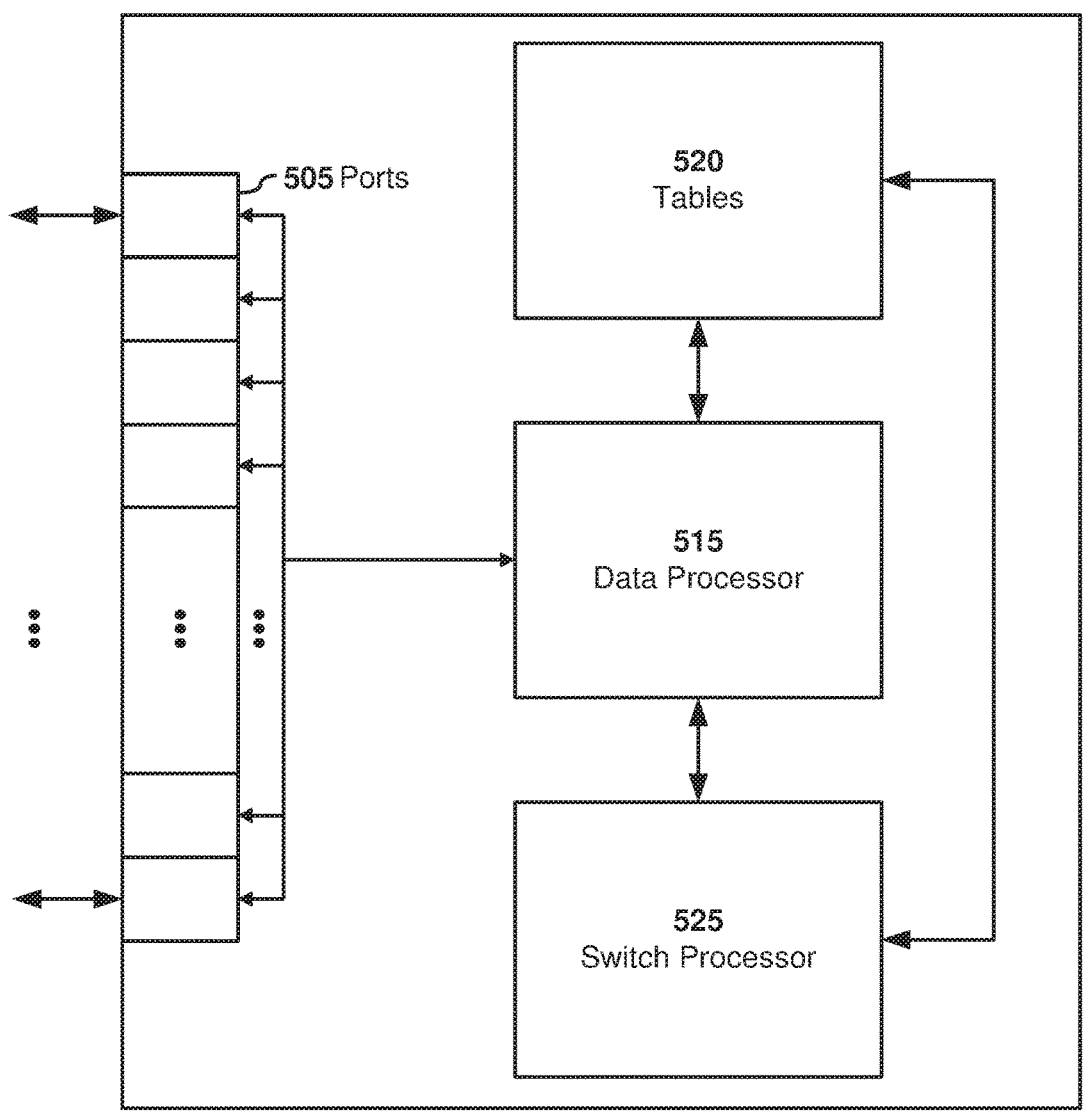
FIG. 5 depicts a block diagram of an information handling system 500 according to embodiments in this patent document.

FIG. 5 depicts a block diagram of an information handling system 500 according to embodiments in this patent document. FIG. 5 depicts a block diagram of an information handling system 500 according to embodiments of the present disclosure. It will be understood that the functionalities shown for system 500 may operate to support various embodiments of an information handling system—although it shall be understood that an information handling system may be differently configured and include different components. As illustrated in FIG. 5, system 500 may comprise a plurality of I/O ports 505, a data processing and fabric component or processor 515, tables 520, and a switch control functionality processor 525. In embodiments, the I/O ports 505 are connected to one or more nodes. The data processing functionality 515 may use information included in the network data received at the device 500, as well as information stored in the tables 520, to identify a next hop for the network data, among other possible activities. In embodiments, the switching fabric then schedules the network data for propagation through the device to an egress port for transmission to the next hop.

In the illustrated system, all major system components may connect to a bus, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments in this patent document address key limitations of the prior art, the wireless backhaul Ethernet on the wireless AP. In embodiments, the wired backhaul limitation is removed and thereby does not impact the ability to communicate using IEEE 802.11ac wave 2 or any other high speed wireless communications. Thus, throughput especially using multiple clients having simultaneous downlinks is improved.

One of ordinary skill in the art will appreciate that various benefits are available as a result of the present invention.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for overcoming a wireless backhaul limitation, comprising:
   monitoring traffic flow information about a plurality of wireless access points;
   identifying a first wireless access point from the plurality of wireless access points based on traffic flow going above a predetermined threshold level;
   determining one or more available wireless access points from the plurality of wireless access points that have wired bandwidth available and is within wireless connectivity of the first wireless access point;
   selecting a second wireless access point from the one or more available wireless access points;
   establishing a wireless connection between the first and the second wireless access points; and
   using the wireless connection between the first and the second wireless access points to provide data from the second wireless access point to the first wireless access point for the first wireless access point to service one or more clients wirelessly connected to the first wireless access point without requiring any of the one or more clients to wirelessly connect to the second wireless access point.

2. The method of claim 1 wherein the traffic flow information includes throughput.

3. The method of claim 1 wherein the traffic flow information includes an identification of a number of clients.

4. The method of claim 1 further comprising:
   determining that the first wireless access point traffic flow has gone below the predetermined threshold; and
   terminating the wireless connection between the first and the second wireless access points.

5. The method of claim 1 wherein the predetermined threshold is based on a wired bandwidth limit for the first wireless access point.

6. The method of claim 1 further comprising receiving traffic flow information from at least one wireless access point.

7. The method of claim 1 further comprising using an equal cost multipath method to distribute traffic between the first and the second wireless access points.

8. The method of claim 1 wherein the selecting the second wireless access point is based on traffic information from the second wireless access point.

9. A wireless controller for use in a networking system comprising the wireless controller and a plurality of wireless access points, each wireless access point having a wired backhaul connection with a wired backhaul bandwidth limit, the wireless controller comprising:
   one or more processors; and
   a non-transitory computer-readable medium or media comprising one or more sequences of instructions which, when executed by at least one of the one or more processors, causes steps to be performed comprising:
      identifying a first wireless access point from the plurality of wireless access points that has reached a threshold value related to its wired bandwidth limit;
      identifying a second wireless access point from the plurality of wireless access points that has bandwidth available within its wired bandwidth limit and is within wireless communication range of the first wireless access point; and
      causing traffic intended for a client wirelessly connected to the first wireless access point to be relayed to the first wireless access point by the second wireless access point via a wireless connection between the first and the second wireless access points thereby reducing wired bandwidth usage of the first wireless access point without requiring the client to wirelessly connect to the second wireless access point.

10. The wireless controller of claim 9 further configured to monitor information related to traffic of the plurality of wireless access points.

11. The wireless controller of claim 10 wherein the threshold value is based upon projected throughput using one or more metrics obtained from the information related to traffic.

12. The wireless controller of claim 11 wherein the information related to traffic includes an identification of a number of clients.

13. The wireless controller of claim 11 wherein the information related to traffic includes an identification of a type of application.

14. The wireless controller of claim 9 further configured to determine that the first wireless access point's traffic flow has gone below a predetermined threshold.

15. The wireless controller of claim 14 further configured to cause the traffic intended for the client wirelessly connected to the first wireless access point to no longer be relayed to the first wireless access point via the wireless connection between the first and the second wireless access points but rather to be sent to the first wireless access point via its wired connection.

16. The wireless controller of claim 9 further configured to select, at least in part, the second wireless access point based on an available channel.

17. A wireless network system, comprising:
   a plurality of wireless access points;
   an Ethernet switch coupled to the plurality of wireless access points, each wireless access point having a wired bandwidth limitation; and
   a wireless controller that: provides control functionality for the plurality of wireless access points; monitors traffic information related to at least some of the wireless access points; and responsive to a metric obtained from the traffic information related to the first wireless access point crossing a threshold related to the first wireless access point's wired bandwidth limitation, causes traffic used to service a client wirelessly connected to a first wireless access point to be distributed to at least one other wireless access point that wirelessly communicates to the first wireless access point its portion of the traffic for servicing the client that is wirelessly connected to a first wireless access point so that a wired backhaul of the at least one other wireless access point is effectively shared with the first wireless access point.

18. The system of claim 17 wherein the wireless controller is further configured to resume normal traffic routing to the first wireless access point via its wired connection responsive to the first wireless access point's wired bandwidth usage dropping below the first wireless access point's wired bandwidth limitation.

19. The system of claim 17 wherein the wireless controller distributes the traffic across a wireless connection.

20. The system of claim 17 wherein the traffic information includes an identification of a type of client.

* * * * *